May 5, 1931.  G. R. HENSHALL  1,803,801
CONTINUOUS COOKER FOR FISH REDUCTION
Filed April 29, 1929
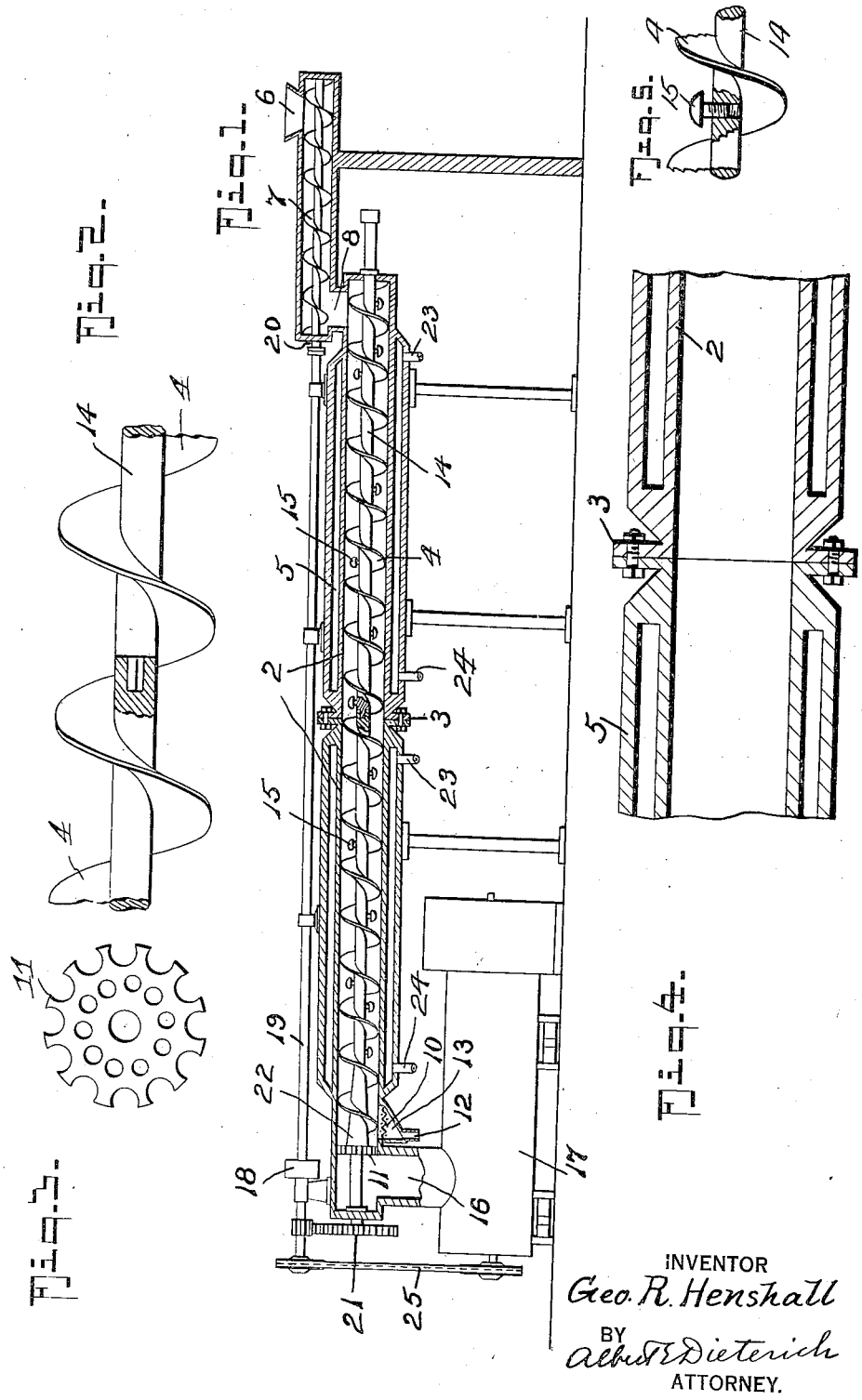
INVENTOR
Geo. R. Henshall
BY
Albert F. Dieterich
ATTORNEY.

Patented May 5, 1931

1,803,801

UNITED STATES PATENT OFFICE

GEORGE R. HENSHALL, OF VANCOUVER, BRITISH COLUMBIA, CANADA

CONTINUOUS COOKER FOR FISH REDUCTION

Application filed April 29, 1929, Serial No. 358,935, and in Canada February 28, 1929.

This invention relates to a cooker for fish reduction processes, in which pilchards or other suitable fish material easily procurable in quantity are cooked in such a way that the protein material may be readily separated from the oleaginous liquor whereby it becomes available for use as fertilizer or chicken feed, the liquor being also separated into the two components water and oil and the latter made available for industrial use.

The apparatus is intended primarily for use in connection with a co-pending application for a process which application was filed on the 29th day of September, 1928, under Serial No. 309,361. This process has reference to the chemical preparation or treatment of the fish material previous to cooking and expressing the oil, and the cooker herein referred to is peculiarly advantageous in this connection.

The cooking operation is carried on continuously in a cylindrical tubular member within which a helical conveyor secured to and driven by an axial shaft revolves. The cooking is effected by low pressure steam circulating in an exterior annular casing so that when the fish material has been propelled to the discharge end of the cooker the cooking operation is completed.

The apparatus is constructed in convenient lengths suited to the particular installation, and the character of the fish material determines the length of the traverse and the number of the sections, which may be superposed or otherwise as desired.

Salient features of the invention are that a suitable inclination is given to the casing whereby the oleaginous liquor drains towards the discharge end as it is released by the cooking process following the preliminary chemical treatment. The completely cooked fish material is forced against a perforated baffle plate by the action of the helix so that the remaining liquid content drops directly upon a strainer grating positioned over the discharge sump whilst the drier material is similarly collected and delivered to the screw compressor for the final extraction of any residual liquor.

With a view to aid in the more complete breaking up of the material traversing the conveyor radial paddles are disposed at intervals on the conveyor to disturb and separate the travelling mass.

The invention is better described by the aid of the drawing which accompanies and forms a part of this application and in which a longitudinal sectional elevation of the cooker is shown in combination with the necessary adjacent apparatus.

In the drawings:

Figure 1 is a vertical longitudinal section illustrating the invention.

Figure 2 is an enlarged detail elevation, parts being broken away, showing the manner of coupling the screw sections together.

Figure 3 is a detail elevation of the apertured baffle plate.

Figure 4 is a detail section showing how the steam jacketed casing sections are coupled together.

Figure 5 is an enlarged detail view of one of the baffles.

In these drawings the numeral 2 indicates the cylindrical casing of my continuous cooker which for convenience of installation and repair is formed in suitable lengths which are connected at the joint ring 3. A revolvable helix 4 fitting the inner surface of the casing 2 forms a conveyor of usual type for propelling the fish material which is cooked whilst in transit by the annular steam jacket 5 which surrounds the casing 2.

The raw material is fed into the hopper 6 thence dropping directly upon the feed conveyor 7 by which it is traversed to the feed aperture 8 of the cooker, the latter being installed with sufficient angularity to the horizontal to effect continuous drainage of the oil towards the discharge end of the cooker, finally reaching the outlet through the strainer 10.

At the rear of the strainer is an apertured baffle plate 11 through which the comparatively dry product is expressed by the final action of the conveyor 4. The oil drain 12 connects with the oil sump 13 and with suitable storage containers (not shown).

On the conveyor shaft 14 are paddle members 15 at suitably spaced intervals for the purpose of disturbing the material in its traverse through the cooker and so aiding in the extraction of the oil.

The drier material expressed through the baffle 11 falls directly into the hopper 16 of an ordinary helical extractor-press 17, whence the product is discharged as practically dry meal-cake and separated oleaginous liquor.

It is to be noted that at the delivery end of the cooker the boss of the helical conveyor has a conical enlargement 22. This has the effect of gradually reducing the effective cross sectional area thereby correspondingly compressing the protein material at its point of delivery through the apertured baffle plate 11.

Each section of the cooker may require a different heat treatment owing to the varying character of the fish material and to provide for this, separate steam control is provided on each section, the inlet being at 23 and the drain or outlet at 24.

This more exact method of heat control in combination with quick drainage of the oil is peculiarly necessary with my process where very rapid separation of the protein from the oil is obtained, making it necessary that the oil should not be overheated and thus damaged in colour.

The cooker is driven mechanically in any convenient manner, such as by a belt on the driving pulley 18 on the main shaft 19, this latter being continued over the cooker to the feed end at 20 where it actuates the feed conveyor 7, and at the discharge end being connected through the gearing 21 to drive the shaft 14 and by a sprocket and chain mechanism 25 driving the oil extracting screw-press 17.

Having now particularly described my invention, what I claim and desire to be protected in by Letters Patent, is:

In a continuous cooker for fish reduction processes the combination comprising, a cylindrical casing enclosing a helical conveyor and encircled by an annular steam jacket, the construction of the same in connective sections, whereby said cooker may be conformed to space requirements either in the linear or superposed relation of its parts, the construction of the delivery end of said cooker characterized by a cone-shaped termination of the boss of the conveyor helix whereby the effective cross-sectional area of the delivery end of said casing is gradually decreased thereby subjecting the fish material to an increasing pressure which reaches a maximum at the point of delivery, a drainage receptacle of the nature of a sump at the bottom of the said cooker and adjacent its delivery end, a removable strainer of suitable fabricated metal between said sump and said casing, an apertured baffle plate forming a transverse closure to said casing and through which the expressed fish material is discharged, the construction of said cooker being characterized by the giving to the said casing of an angular inclination whereby the liquid content of the fish material is constantly drained towards the delivery end of the said cooker, the construction characterized by the addition of radial paddles secured at spaced apart intervals along said helical conveyor, and the construction characterized by the application of separate steam control members to each of the said sections whereby one section may be operated at a different temperature to another section.

In testimony whereof I affix my signature.

GEORGE R. HENSHALL.